United States Patent
Shim

(10) Patent No.: US 7,266,441 B2
(45) Date of Patent: Sep. 4, 2007

(54) SYSTEM AND METHOD FOR CONTROLLING IDLING STOP OF HYBRID ELECTRIC VEHICLE

(75) Inventor: Dong-Soo Shim, Cheonan-si (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 0 days.

(21) Appl. No.: 11/542,400

(22) Filed: Oct. 3, 2006

(65) Prior Publication Data

US 2007/0099755 A1    May 3, 2007

(30) Foreign Application Priority Data

Nov. 2, 2005    (KR) .................. 10-2005-0104352

(51) Int. Cl.
*F02N 11/08*    (2006.01)
*B60L 7/24*    (2006.01)

(52) U.S. Cl. .................. 701/112; 123/179.3

(58) Field of Classification Search ............. 701/112, 701/102, 114; 123/179.3, 179.4, 179.5; 290/31, 290/38
See application file for complete search history.

(56) References Cited

U.S. PATENT DOCUMENTS 6,807,934 B2 * 10/2004 Kataoka et al. .......... 123/179.3

FOREIGN PATENT DOCUMENTS

| JP | 08-061110 | 3/1996 |
| JP | 2001-227375 | 8/2001 |
| JP | 2001-268705 A * | 9/2001 |
| JP | 2003-291693 | 10/2003 |
| JP | 2006-132451 A * | 5/2006 |
| WO | WO 0171181 | 9/2001 |

* cited by examiner

*Primary Examiner*—Hieu T. Vo
(74) *Attorney, Agent, or Firm*—Morgan Lewis & Bockius LLP

(57) ABSTRACT

A hybrid electric vehicle having a brake operated by compressed air, and a system and method for controlling the idling stop of a hybrid electric vehicle in which, when the vehicle idling-stops on a slope having a predetermined angle, the idling stop is allowed only when the pressure of compressed air within an air tank is higher than a predetermined pressure in the state in which the tilt angle of the current slope is less than a predetermined angle, thereby preventing accidents due to the vehicle being pushed forwards or backwards.

5 Claims, 2 Drawing Sheets

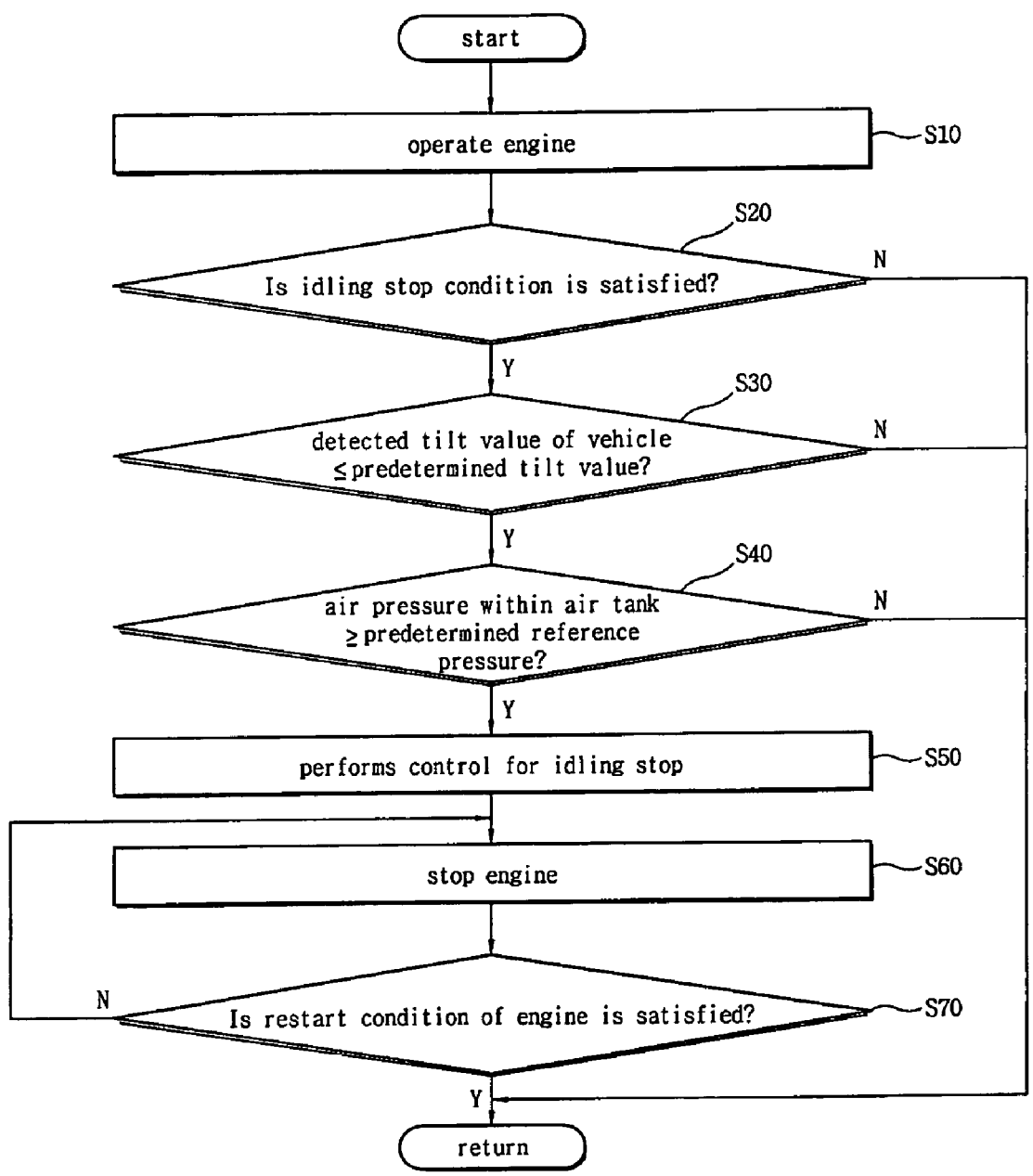

SYSTEM AND METHOD FOR CONTROLLING IDLING STOP OF HYBRID ELECTRIC VEHICLE

CROSS-REFERENCE TO RELATED APPLICATIONS

The present application is based on, and claims priority from, Korean Application Serial Number 10-2005-0104352, filed on Nov. 2, 2005, the disclosure of which is hereby incorporated by reference herein in its entirety.

FIELD OF THE INVENTION

The present invention relates generally to a system and method for controlling the idling stop of a hybrid electric vehicle, and more particularly to a system and method for controlling idling stop when a hybrid commercial vehicle travels on a slope.

BACKGROUND OF THE INVENTION

Generally, a Hybrid Electric Vehicle (HEV) has an idling stop system to improve gas mileage. Such an idling stop system stops an engine when the engine is in an idling stop condition, and automatically operates the engine when the engine is restarted.

In the case of vehicles having brakes operated by compressed air (the majority of hybrid commercial vehicles, hereinafter referred to simply as commercial vehicles), among HEVs, the idling stop on a level surface, rather than a sloped one, is controlled through a method similar to that of general hybrid electric vehicles, but the situation on a slope is different. That is, in the above-described vehicle, air is compressed by a compressor and the compressed air is stored in an air tank, and then the compressed air is used when the brake is operated. The compressor is coupled to the driving axle of an engine and then operated, thus the compressor cannot generate a sufficient amount of compressed air when the engine is idling-stopped.

As a result, when the engine is idling-stopped in the situation in which a sufficient amount of compressed air is not ready, the vehicle moves or is pushed forwards or backwards while being operated on a slope, thus causing a serious problem in safety.

SUMMARY OF THE INVENTION

Embodiments of the present invention provide a system and method for controlling the idling stop of a hybrid electric vehicle in which, when the vehicle idling-stops on a slope having a predetermined angle, the idling stop is allowed only when the pressure of compressed air within an air tank is higher than a predetermined pressure in the state in which the tilt angle of the current slope is less than a predetermined angle, thereby preventing accidents due to the vehicle being pushed forwards or backwards.

A system for controlling the idling stop of a vehicle according to an embodiment of the present invention is applied to an hybrid electric vehicle having a brake operated by compressed air, and allows the temporary stop of the engine when an idling stop condition is satisfied and the air pressure of the air tank for a break is higher than a predetermined pressure in state in which the tilt of the vehicle is less than a predetermined tilt.

In one exemplary embodiment of the invention, a system for controlling an idling stop includes an engine; a motor-generator including both a motor function and a generator function; an inverter connected to a high-voltage battery and configured to convert direct current from the high-voltage battery into alternating current for the motor-generator; a Direct Current-Direct Current (DC—DC) converter provided between the inverter and a low-voltage battery and configured to boost voltage from the low-voltage battery and compensate for a voltage difference between the low-voltage battery and the high-voltage battery; a tilt sensor mounted in the vehicle and configured to detect a tilt angle of the vehicle and output a signal; a pressure sensor for detecting air pressure within an air tank for the brake of the vehicle and outputting a signal; and a Motor Control Unit (MCU) for controlling an idling stop of the engine by controlling operation of the motor-generator in response to states of detected signals from the tilt angle sensor and the pressure sensor.

A method of controlling an idling stop includes the steps of determining whether an idling stop condition is satisfied after an engine of the vehicle has been operated; detecting a tilt angle of the vehicle using a tilt sensor mounted in the vehicle when the idling stop condition is satisfied; detecting a pressure of an air tank for the brake using a pressure sensor installed within the air tank if, as a result of the detection of the tilt angle of the vehicle, the tilt angle is determined to be less than a predetermined reference tilt angle for control of an idling stop; allowing the idling stop when the detected air pressure is higher than a predetermined reference pressure for control of the idling stop and then performing the idling stop by turning off the engine.

BRIEF DESCRIPTION OF THE DRAWINGS

For a better understanding of the nature and objects of the present invention, reference should be made to the following detailed description with the accompanying drawings, in which:

FIG. 2 is a flowchart illustrating a method of controlling an idling stop according to one embodiment of the present invention.

DETAILED DESCRIPTION OF THE PREFERRED EMBODIMENTS

Figure 1:
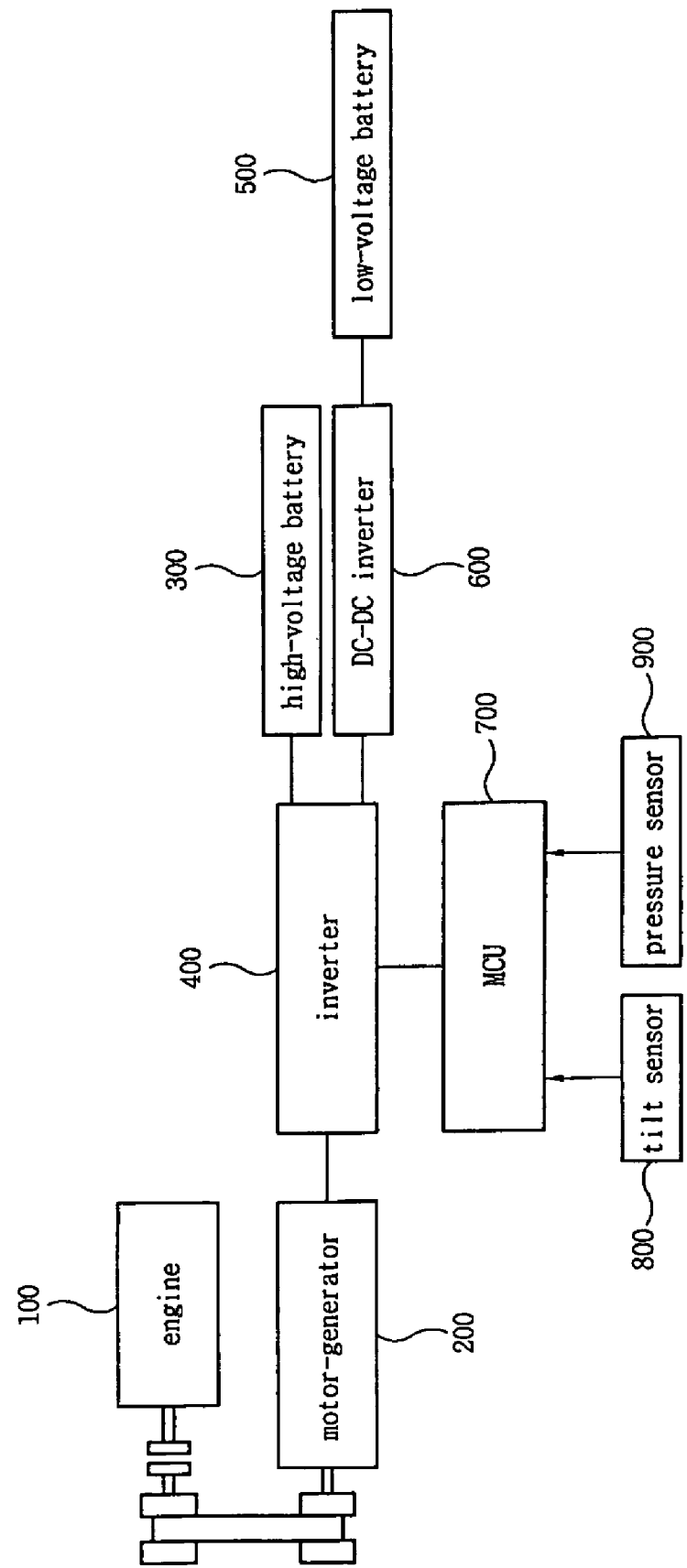
FIG. 1 is a block diagram illustrating a system for controlling an idling stop according to one embodiment of the present invention.

A preferred embodiments of the present invention are described with reference to the accompanying drawings.

As illustrated in FIG. 1, a hybrid commercial vehicle having the system for controlling an idling stop according to an embodiment of the present invention, that is, a vehicle, the brakes of which are operated by compressed air, includes an engine 100, a motor-generator 200 performing both a motor function and a generator function, an inverter 400 which is connected to a high-voltage battery 300 and converts direct current from the high-voltage battery into alternating current for the motor-generator 200, a Direct Current-Direct Current (DC—DC) converter 600 which is provided between the inverter 400 and a low-voltage battery 500, boosts voltage from the low-voltage battery 500, and compensates for the voltage difference between the low-voltage battery 500 and the high-voltage battery 300, a tilt sensor 800 which is mounted in the vehicle, detects the tilt of the vehicle, and outputs a signal, a pressure sensor for detecting air pressure within an air tank for the brakes of the vehicle and outputting a signal, and a Motor Control Unit 700 for controlling the idling stop of the engine by controlling the operation of the motor-generator 200 in response to the states of signals received from the tilt sensor 800 and the pressure sensor 900.

In this case, the engine 100 is operated using gasoline or diesel fuel, and can be operated using two or more power sources.

Furthermore, the motor-generator 200, which has both a motor function and a generator function, switches to a motor mode or a generator mode as needed, and is connected to the crank axis of the engine 100 through a belt. In this case, the motor-generator 200 generates voltage 42V in the generator mode. The reason why the motor-generator generates voltage 42V is as follows. That is, more electrical equipment and electronic control devices are mounted in a hybrid electronic vehicle than in a general vehicle, thus increasing the power consumption of the vehicle, and the situation cannot be dealt with using a conventional 28V generating system (in a passenger car, a 14V generator and a 12V battery).

Furthermore, the high-voltage battery 300 is a 36V battery, is charged at a voltage of 42V, generated by the motor-generator 20, and outputs a voltage of 36V. In contrast, the low-voltage battery 500 is a 28V battery, is charged at a voltage of 28V, to which the 42V generated by the motor-generator 200 is stepped down by the DC—DC converter 600, and outputs a voltage of 24V. Meanwhile, the voltage of 24V output from the low-voltage battery 500 is boosted through the DC—DC converter 600, and compensates for the voltage difference with the high-voltage battery 300.

The MCU 700 is coupled to the inverter, controls the motor-generator 200, receives various types of sensor signals, speed signals, brake manipulation signals, clutch manipulation signals, and gear location signals, collects information based on the current state of the vehicle and performs control for operation of the motor-generator 200 according to the collected information. MCU 700 may comprise a processor and memory, and associated hardware and software as may be selected and programmed by a person of ordinary skill in the art based on the teachings of the present invention as contained herein.

As described above, in the present invention, when the vehicle stops on a road having a predetermined tilt, the MCU 700 collects information about the state of the vehicle and controls the idling stop of the vehicle. That is, the MCU 700 checks the speed of the vehicle, a brake signal, a clutch signal, a gear position, and the tilt of the vehicle and the pressure of the compressed air within an air tank using various types of sensors, and then controls the idling stop of the vehicle. The a more detailed description of the idling stop is given with reference to FIG. 2.

As illustrated in FIG. 2, step S10 is a step of operating an engine (reference number 100 of FIG. 1) which realizes the operation of the engine 100 by a motor-generator (reference number 200 of FIG. 1).

When the vehicle stops on a road having a predetermined tilt, for example, about 11°–13°, while traveling after the engine 100 has been operated, an MCU (reference number 700 of FIG. 1) checks the state of the vehicle using various types of sensors. That is, the MCU 700 checks the speed of the vehicle, a brake signal, a clutch signal, and a gear position, and then determines whether an idling stop condition is satisfied at step S20. In this step, the idling stop condition, as known to those skilled in the art, is determined to be satisfied when the speed of the vehicle is less than a predetermined speed (generally, 5 km/h), and the position of a gear is in a neutral state, in the situation in which a brake and a clutch have been manipulated. If the idling stop condition is not satisfied, the engine 100 is continuously operated.

However, if the idling stop condition is satisfied, the MCU 700 determines the current tilt angle of the vehicle using the tilt sensor mounted in the vehicle. The idling stop is allowed only when the current tilt angle of the vehicle is less than a predetermined tilt at step S30. If the current tilt angle of the vehicle is higher than the predetermined tilt, the engine 100 is continuously operated.

Furthermore, when the idling stop condition and tilt condition of the vehicle are satisfied, the MCU 700 checks the pressure of the compressed air within the air tank at step S40. That is, the idling stop is completed only when the pressure is higher than a predetermined reference pressure. The reason why the pressure of the compressed air within the air tank is checked is to prevent the vehicle from being pushed forward or backward, thereby causing a serious safety problem when the engine is idling-stopped in the situation in which a sufficient amount of compressed air is not ready.

When the idling stop conditions are satisfied at steps S20, S30 and S40, the engine 100 is idling-stopped and then turned off at steps S50 and S60.

Meanwhile, when the vehicle restarts in the state in which the idling stop is performed, the MCU 700 checks the state of the vehicle using various types of sensors, and then operates the engine 100 when the restart condition of the engine 100 is satisfied at step S70. If the restart condition of the engine 100 is not satisfied, the stopped state of the engine 100 is continuously maintained at step S60, and the MCU 700 checks the state of the vehicle using various types of sensors until the restart condition of the engine 100 is satisfied.

As described above, in the present invention, when the vehicle idling-stops on a slope having a predetermined tilt, the idling stop is allowed only when the pressure of compressed air within an air tank is higher than a predetermined pressure in the state in which the tilt angle of the current slope is less than a predetermined angle, thereby preventing accidents due to the vehicle being pushed forwards or backwards.

As described above, in the system and method for controlling the idling stop of a hybrid electronic vehicle, there is an advantage in that when the vehicle idling-stops on a slope having a predetermined tilt, the idling stop is allowed only when the pressure of compressed air within an air tank is higher than a predetermined pressure in the state in which the tilt angle of the current slope is less than a predetermined angle, thereby preventing safety accidents due to the vehicle being pushed forwards or backwards.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for controlling an idling stop of a hybrid electric vehicle having a brake operated by compressed air, comprising:
   an engine;
   a motor-generator including both a motor function and a generator function;

an inverter connected to a high-voltage battery and configured to convert direct current from the high-voltage battery into alternating current for the motor-generator;

a Direct Current-Direct Current (DC—DC) converter provided between the inverter and a low-voltage battery and configured to boost voltage from the low-voltage battery and compensate for a voltage difference between the low-voltage battery and the high-voltage battery;

a tilt sensor mounted in the vehicle and configured to detect a tilt angle of the vehicle and output a signal;

a pressure sensor for detecting air pressure within an air tank for the brake of the vehicle and outputting a signal; and a Motor Control Unit (MCU) for controlling an idling stop of the engine by controlling operation of the motor-generator in response to states of detected signals from the tilt angle sensor and the pressure sensor.

2. The system as defined in claim 1, wherein the MCU further receives a vehicle speed signal, a brake manipulation signal, a clutch manipulation signal, and a gear position signal, in order to determine whether an idling stop condition of the vehicle is satisfied.

3. A method of controlling an idling stop of a hybrid electronic vehicle having a brake operated by compressed air, comprising the steps of:

determining whether an idling stop condition is satisfied after an engine of the vehicle has been operated;

detecting a tilt angle of the vehicle using a tilt sensor mounted in the vehicle when the idling stop condition is satisfied;

detecting a pressure of an air tank for the brake using a pressure sensor installed within the air tank if, as a result of the detection of the tilt angle of the vehicle, the tilt angle is determined to be less than a predetermined reference tilt angle for control of an idling stop;

allowing the idling stop when the detected air pressure is higher than a predetermined reference pressure for control of the idling stop and then performing the idling stop by turning off the engine.

4. The method as defined in claim 3, wherein the idling stop condition is determined using a vehicle speed signal, a brake manipulation signal, a clutch manipulation signal, and a gear position signal.

5. The method as defined in claim 3, further comprising operating the engine by prohibiting the idling stop when the idling stop condition is not satisfied, a current tilt angle of the vehicle is greater than the predetermined tilt angle, or the air pressure of the air tank for the brake is less than the predetermined reference pressure.

* * * * *